(No Model.)
C. H. GARY.
BICYCLE WHEEL.
No. 588,975. Patented Aug. 31, 1897.
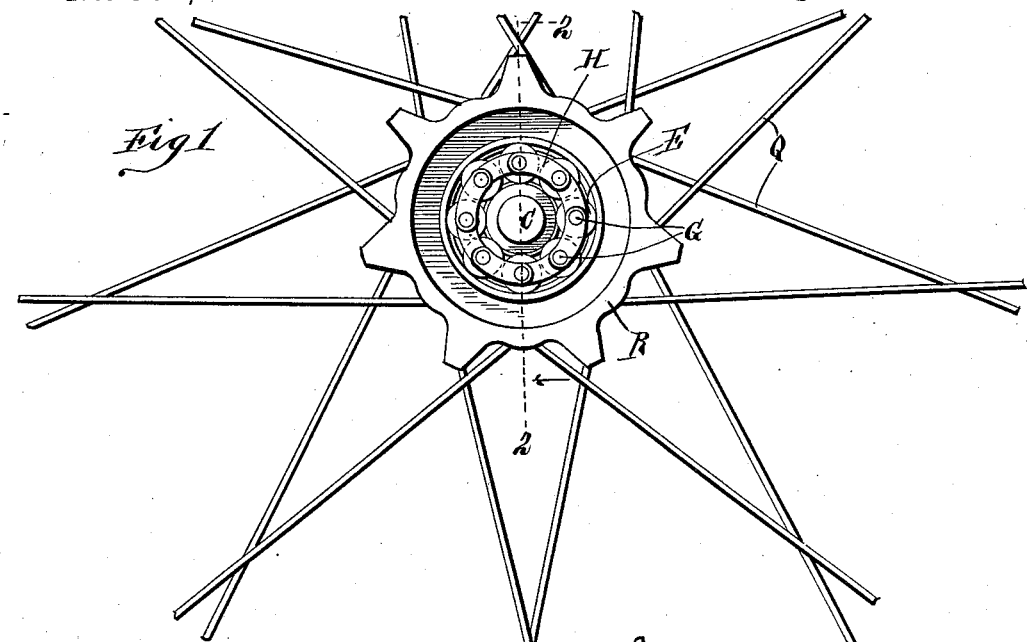
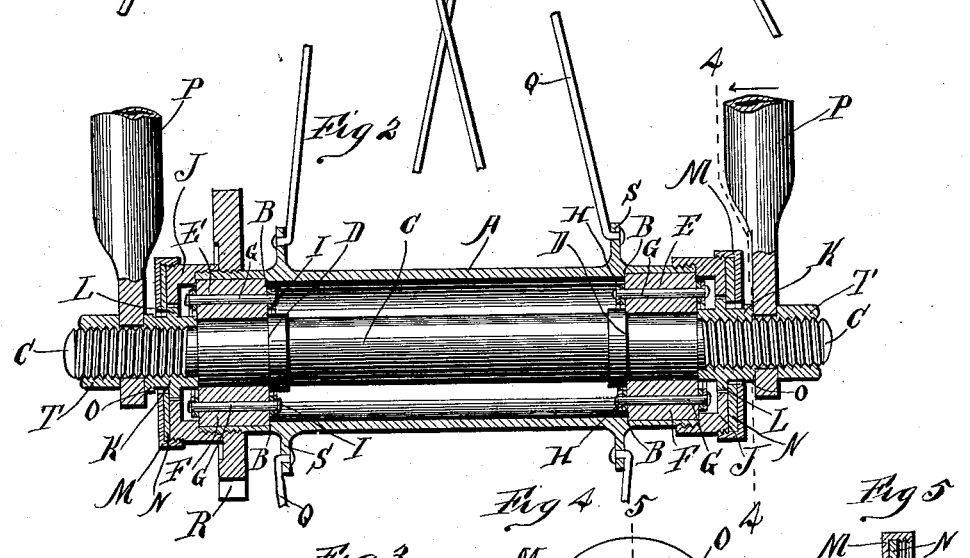
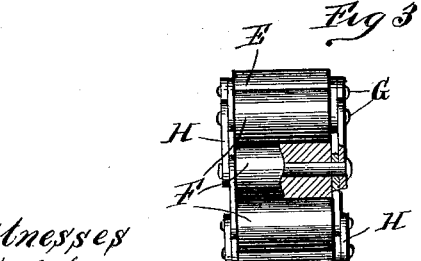
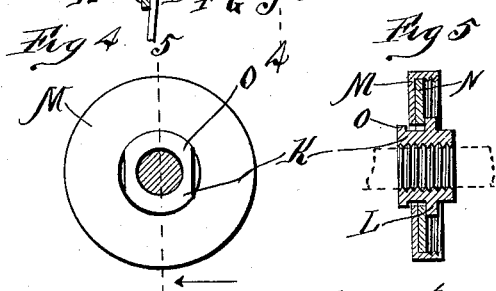
Witnesses
W. C. Coulies
C. H. Crawford
Inventor
Charles H. Gary
By Coburn & Strong
Atty

UNITED STATES PATENT OFFICE.

CHARLES H. GARY, OF CHICAGO, ILLINOIS.

BICYCLE-WHEEL.

SPECIFICATION forming part of Letters Patent No. 588,975, dated August 31, 1897.

Application filed January 18, 1897. Serial No. 619,549. (No model.)

*To all whom it may concern:*

Be it known that I, CHARLES H. GARY, a citizen of the United States, residing at Chicago, in the county of Cook and State of Illinois, have invented a certain new and useful Improvement in Bicycle-Wheels, which is fully set forth in the following specification, reference being had to the accompanying drawings, in which—

Figure 1 is an end view of the hub of a bicycle-wheel with the caps and retaining-nuts of the roller-bearing removed. Fig. 2 is a vertical sectional view taken on the line 2 2 of Fig. 1. Fig. 3 is a side view of a nest of rollers detached, showing one of the rollers partly in section. Fig. 4 is a sectional view of the end of the hub and axle, taken on the line 4 4 of Fig. 2, looking to the left, not showing any of the spokes or any part attached to the hub. Fig. 5 is a vertical sectional view taken on the line 5 5 of Fig. 4.

The object of my invention is to make an antifriction-bearing for bicycles which can be completely housed and at the same time is simple, durable, and readily accessible without dismantling the parts of the machine to any great extent.

My invention consists of the parts and combination of parts hereinafter fully described, and made the subject-matter of the claims hereof.

In the accompanping drawings, A represents the hub of a bicycle-wheel, which I rim out at each end, making shoulders B B.

C is the axle, which is also provided with two shoulders D D.

E is what I call a "nest of rollers." Each roller F has pintles G, on which it revolves. These pintles G extend out a short distance beyond the ends of their roller, and these pintles are all connected together pivotally by the short links H. The links H are held pivotally upon these pintles either by small nuts or by heading the pintles down slightly after the links are placed upon them, as clearly shown at I in Fig. 2. The nest of rollers is held in place by caps J, that are screwed upon the ends of the hub, and by nuts K, which are screwed upon the axle. The nuts K are provided with an annular flange L. There is a slight space between the flange L and the cap J, so that the flange, which turns with the axle, will play freely in the cap.

M is a dust-cap, which is secured to the retaining-cap J preferably by being screwed tightly thereto. Within the dust-cap M, I place a flexible packing N, which covers the space between the flange L of the nut and the retaining-cap J. The dust-cap has a central opening sufficiently large to pass over the head O of the nut K, but considerably smaller than the annular flange L on said nut.

P are the arms of the bifurcated post or fork which rests upon the axle.

Q are the spokes of the wheel, and R the sprocket-wheel; S, the spoke-flanges by which the spokes are secured to the hub.

It will be observed that there is a nest of rollers at each end of the hub, that said rollers fit closely between the hub and axle through the entire circumference of the axle, and that by removing the dust-cap and retaining-caps from the ends of the hub the nest of rollers can be readily removed from their places or inserted in their places. Of course if the axle has the bifurcated post or fork connected to it and the nuts T on the ends of the axle they have to first be removed from the axle in order to remove from their respective boxes the nest of rollers.

I am aware that I am not the first to make antifriction-bearings, but I find that it is important to have the rollers fit closely to the axle and each be provided with an axle on which they turn and by which they are spaced by the ends of their axle being pivotally connected, and that they be housed by means of a shoulder on the hub and on the axle and retaining-caps, which are made substantially dust-proof.

My roller-bearings possess the minimum of friction, as there are substantially no moving surfaces which rub against other surfaces.

All the parts of my antifriction-bearing devices are simple, they are few in number, and are all readily detached and are accessible for repairs or renewals.

I preferably make the edges of the retaining-cap and dust-proof cap of a rough or serrated nature for convenience in removing.

It will be readily understood that my antifriction-bearing may be applied to all the axle-bearings in a bicycle.

I preferably provide the interior of the enlarged end of the hub with a hard-metal lining, and also that portion of the axle which forms a bearing for the rollers with hard-metal sleeves for the rollers to contact with to prevent wear of the hub or sleeves by the rolling contact of the rollers. I may provide both or either with these hard-metal contact-surfaces to save making the whole hub or whole of the axle of hard metal.

Having described the construction and operation of my invention, what I claim, and desire to secure by Letters Patent, is—

1. In a bicycle, a hub provided at each end with an enlarged chamber terminating at a shoulder; an axle provided with shoulders in the same plane with the shoulders on the hub; rollers adapted to fit between the hub and axle and be held in position laterally in one direction by the shoulders on the hub and axle, said rollers being spaced by pintles which are united pivotally with short connecting-links; pintles and connecting-links; and a retaining-cap secured to the end of the hub to hold the rollers in place between said retaining-cap and the shoulders on the hub and axle.

2. In a bicycle, the hub having interior annular shoulders; an axle having shoulders in the same plane as the shoulders on the hub; a nest of rollers fitting to the axle throughout the circumference and spaced from each other; pintles and connecting-links to permit the rollers to travel around the circumference of the axle; a retaining-cap fitted to the hub, and a nut secured to the axle and provided with an annular flange that fits loosely within the retaining-cap; and a dust-cap secured to the retaining-cap, and covering the space between the nut-flange and the retaining-caps, substantially as specified.

CHARLES H. GARY.

Witnesses:
ALLAN A. MURRAY,
FLORA BROM.